United States Patent [19]

Kumar et al.

[11] Patent Number: 5,885,546

[45] Date of Patent: Mar. 23, 1999

[54] PROCESS FOR THE PREPARATION OF TITANIUM SILICATES

[75] Inventors: Rajiv Kumar; Anuj Raj; Sujit Baran Kumar; Paul Ratnasamy, all of Maharashtra, India

[73] Assignee: Council of Scientific & Industrial Research, New Delhi, India

[21] Appl. No.: 832,997

[22] Filed: Apr. 4, 1997

Related U.S. Application Data

[63] Continuation of Ser. No. 353,569, Dec. 9, 1994, abandoned.

[51] Int. Cl.$^6$ .................................................. C01B 39/46
[52] U.S. Cl. ........................................... 423/703; 423/326
[58] Field of Search .................... 423/326, 701, 423/702, 707, 703

[56] References Cited

U.S. PATENT DOCUMENTS

| | | | |
|---|---|---|---|
| 3,329,482 | 7/1967 | Young | 423/326 |
| 4,323,481 | 4/1982 | Kaduk | 423/702 |
| 4,410,501 | 10/1983 | Taramasso et al. | 423/326 |
| 5,212,302 | 5/1993 | Kitamura et al. | 502/54 |

FOREIGN PATENT DOCUMENTS

| | | | |
|---|---|---|---|
| 2071071 | 9/1981 | United Kingdom | C01B 33/12 |

OTHER PUBLICATIONS

Thangaraj, A., et al. *Journal of Catalysis*, vol. 130, No. 1, pp. 1–8 (1991), no month.

Cotton, F. Albert, et al., *Advanced Inorganic Chemistry, A Comprehensive Text*, Fourth Edition, NY, pp. 390–391 (1980), no month.

*Primary Examiner*—Michael Lewis
*Assistant Examiner*—Stuart L. Hendrickson
*Attorney, Agent, or Firm*—Pennie & Edmonds LLP

[57] ABSTRACT

A process for the preparation of crystalline, microporous titanium silicates having the chemical formula: x $TiO_2$: (1−x) $SiO_2$ wherein x is greater than 0.04 and less than or equal to 0.075. These silicates are useful as oxidation catalysts in reactions such as oxidation of hydrocarbons, alcohols, sulfides, and thioethers. The process permits a significant increase of the amount of titanium in the titanium silicates, which results in enhanced catalytic activity.

19 Claims, No Drawings

PROCESS FOR THE PREPARATION OF TITANIUM SILICATES

This is a continuation of application Ser. No. 08/353,569, filed Dec. 9, 1994, now abandoned.

FIELD OF THE INVENTION

This invention relates to an improved process for the preparation of crystalline, microporous titanium silicates. More specifically, it relates to an improved method of manufacture of titanium silicates with the crystal structure of silicalite-1. The material prepared by the process of the present invention are useful as oxidation catalysts in reactions like oxidation of hydrocarbons, alcohols, sulfides, thioethers etc.

BACKGROUND OF THE INVENTION

U.S. Pat. No. 3,329,482 to Young describes crystalline titanosilicates which are prepared from siliceous and inorganic titanium compounds in the absence of organic bases. The U.S. Pat. No. 4,410,501 describes a process for the preparation of titanium silicalite, TS-1 with the formula xTiO$_2$ (1–x) SiO$_2$ where x lies between 0.005 and 0.04. The UK Patent GB 2071071 B, describes a process for the preparation of TS-1 with the structure of silicalite-1. The titanium silicates are useful in catalyzing various oxidation reactions such as the conversion of benzene into phenol, phenol into hydroquinone and catechol, cyclohexanone into cyclohexanone oxime, ethanol into acetaldehyde, isopropanol into acetone etc. In all the above applications, it has been found that the catalytic efficiency of titanium silicate material is directly proportional to the content of titanium in the titanium silicalite. That is, the more the amount of titanium contained in these materials, the higher the rate with which they catalyze the above mentioned conversion processes. Hence, any process of preparation that leads to TS-1 of formula xTiO$_2$ (1–x)SiO$_2$ wherein x is higher than 0.04 would lead to material with improved catalytic activity in the above mentioned reactions.

The process for the preparation of TS-1, in the prior art, as for example in the above mentioned U.S. Pat. No. 4,410,501 (Example 2) was to mix the sources of silicon (preferably silicon tetraethoxide) and titanium (preferably titanium tetraethoxide) at low temperature (5° C.) before adding organic base (such as tetrapropyl ammonium hydroxide, aqueous solution) precooled to 5° C. and water. Since the rate of hydrolysis of titanium tetraethoxide is much faster compared to that of silicon tetraethoxide the cooling of the reaction mixture is important to avoid the formation of insoluble or sparingly soluble titanium oxide/hydroxyoxide, which if formed hinders the formation of titanium silicate. However, the necessity to cool the reactants to 5° C. under industrial conditions is a limitation in the prior art process which entails significantly higher process energy costs. Further, in the above mentioned patent (U.S. Pat. No. 4,410,501), the crystallization time of TS-1 under hydrothermal conditions at autogeneous pressure ranged between six and thirty days. It is quite desirable to reduce the preparation time of TS-1.

SUMMARY OF THE INVENTION

It is an objective of the present invention to develop an improved process for the preparation of titanium silicates with significantly higher content of titanium. It is a further objective of the present invention to develop a process wherein all the process operations are carried out at ambient or higher temperatures. It is a further objective of the present invention to develop a faster process which provides crystalline titanium silicate in less than 6 days.

In accordance with and in fulfillment of the above mentioned objectives, the present invention provides an improved process for the preparation of titanium silicates containing a higher content of titanium than that obtained in prior art processes and wherein all the process operations are carried out at ambient or higher temperatures comprising forming a gel by mixing (a) a source of silicon oxide (b) a source of titanium oxide (c) a β-diketone such as acetylacetone (d) tetrapropyl ammonium hydroxide and water at ambient temperatures, heating the resultant gel at autogeneous pressure and a temperature between 130° to 200° C. for 1–5 days, filtering, washing, drying and calcining the resultant solid composite material at a temperature above 300° C.

It is a significant feature of the present invention that the presence of acetylacetone in the synthesis mixture leads to complexes with the titanium ions forming soluble titanium complexes at ambient temperatures thereby preventing the precipitation of titanium as titanium oxide/hydroxide which process would have occured readily in the absence of acetylacetone at ambient temperatures especially in the basic reaction media with high pH values. To prevent such precipitation of titanium hydroxide it is essential to cool the reaction mixture to 5° C. as is done in the prior art processes. The addition of acetylacetone in the improved process of the present invention maintains the titanium as a soluble complex even at ambient temperatures and thereby eliminates the need for operation at low temperatures leading to significant improvements in operational ease and lower energy costs.

In another feature of the present invention, the presence of significant quantities of titanium as soluble acetylacetone complexes in the reaction medium facilitates the formation of soluble titanium silicate complexes, the said titanium silicate complexes being the precursors in the formation of solid titanium silicates.

One advantageous feature of the present invention is that the choice of the sources of silicon and titanium is not restricted to their respective alkoxides which are relatively expensive raw materials. Instead, other cheaper raw materials like pyrogenic silica, silica gel or even colloidal silica can be used as sources of silicon.

DETAILED DESCRIPTION OF THE INVENTION

Accordingly, the present invention provides an improved process for preparing microporous, crystalline titanium silicates having a silicalite-1 structure and a chemical composition with the formula:

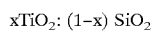

$$xTiO_2: (1-x) SiO_2$$

where in x is equal to or less than 0.075, and characterized by an x-ray diffraction pattern as given in Table-1 and an infrared absorption spectrum as shown in Table-2, which comprises forming a gel by mixing a source of (i) silicon oxide (such as: alkoxides, amorphous silica, colloidal silica etc.) and (ii) titanium oxide (like alkoxide-β diketone mixture), (iii) a nitrogen containing organic base having the formula R$_4$N$^+$ where R represents propyl group and (iv) water at room temperature, heating the resultant gel in an autoclave at autogeneous pressure and a temperature between 140° to 200° C. for 1–5 days filtering, washing, drying and calcining the resultant solid composite material at a temperature in the range of 300°–550° C.

TABLE 1

| | TS-1 | | SILICALITE-1 | |
|---|---|---|---|---|
| 2 θ[a] | R.I[b] | | 2 θ | R.I[b] |
| 7.86 | s | | 7.94 | vs |
| 8.78 | ms | | 8.80 | s |
| 13.18 | w | | 13.22 | w |
| 13.86 | mw | | 13.95 | mw |
| 14.74 | mw | | 14.78 | mw |
| 15.46 | mw | | 15.52 | w |
| 15.89 | mw | | 15.92 | mw |
| 16.48 | mw | | 16.50 | w |
| 17.26 | w | | 17.28 | w |
| 17.64 | w | | 17.66 | w |
| 17.82 | w | | 17.84 | w |
| 19.22 | w | | 19.26 | w |
| 20.36 | mw | | 20.39 | w |
| 20.80 | mw | | 20.87 | mw |
| — | — | | 21.79 | w |
| 22.20 | mw | | 22.22 | mw |
| 23.08 | vs | | 23.12 | vs |
| — | — | | 23.28 | s |
| 23.90 | s | | 23.96 | m |
| — | — | | 24.34 | mw |
| 24.40 | ms | | 24.58 | m |
| 25.69 | mw | | 25.75 | w |
| 25.85 | w | | 25.90 | w |
| 26.64 | w | | 26.70 | w |
| 27.42 | w | | 27.46 | w |
| 29.26 | w | | 29.34 | w |
| 29.90 | mw | | 29.94 | mw |
| 45.10 | w | | 45.12 | mw |
| 45.52 | w | | 45.6 | mw |

[a]the 2θ values may vary by ± 0.05°
[b]R.I. = Relative Intensity,
vs = very strong,
s = strong,
m = mdedium,
w = weak

TABLE 2

| TS - 1 | | SILICALITE - 1 | |
|---|---|---|---|
| $cm^{-1}$ | R.I.[a] | $cm^{-1}$ | R.I.[a] |
| 460 | S | 465 | S |
| 550 | MS | 555 | MS |
| 715 | W | 720 | W |
| 800 | M | 800 | M |
| 960 | M | — | — |
| 1090 | VS | 1095 | VS |
| 1225 | S | 1230 | S |

[a]VS = very strong,
S = strong,
M = medium,
W = weak

The calcined material may be further treated by ion exchange with an aqueous solution of a salt of ammonia and converting the resulting solid into the final composite material by calcination at a temperature within the range of 400°–550° C.

In a preferred embodiment of the present invention the starting mixture may have the molar chemical composition as follows:

0.02–0.05 $TiO_2$:0.04–0.15 acac:$SiO_2$:10–200 $H_2O$:0.2–1.0 $R_4NOH$ where R represents the propyl group and acac represents acetylacetone.

In one embodiment of the present invention, the reaction may be effected in the presence of an alcohol having the formula ROH where R is an alkyl group having 2–5 carbon atoms. The alcohol such as ethyl, propyl, isopropyl, butyl, isobutyl or their mixtures may be used.

The crystalline material of this invention can be characterized by x-ray powder diffraction and infrared spectroscopic examination. The most significant lines of the x-ray powder diffraction pattern of the titanium rich titanium silicates taken on a Rigaku, Geigerflex diffractometer using Cu Kα radiation (40 KV, 20 mA), along with the corresponding data for pure silicalite-1 are shown in Table-1. Silicalite-1 is more fully described by E. M. Flanigen and others in the Journal Nature, vol. 271, pp. 512 (1978).

The unit cell parameters of the titanium silicates of the present invention containing varying amount of titanium are given in Table-3.

| | Unit Cell parameters, A° | | | | |
|---|---|---|---|---|---|
| | x | a | b | c | volume[b] | R[a] |
| Silicalite-1 | 0.000 | 20.089 | 19.884 | 13.381 | 5345.0 | — |
| Ti-silicate | 0.017 | 20.096 | 19.903 | 13.387 | 5354.4 | 0.42 |
| Ti-silicate | 0.029 | 20.102 | 19.917 | 13.386 | 5359.3 | 0.67 |
| Ti-silicate | 0.042 | 20.090 | 19.900 | 13.410 | 5361.2 | 1.0 |
| Ti-silicate | 0.053 | 20.093 | 19.904 | 13.417 | 5365.9 | 1.13 |
| Ti-silicate | 0.066 | 20.097 | 19.911 | 13.435 | 5376.0 | 1.24 |

[a]Ratio of 960 $cm^{-1}$/550 $cm^{-1}$ IR band,
[b]in $(A°)^3$.

The IR bands in framework region exhibited by these titanium silicates are compiled in Table-2. They exhibit a characteristic IR absorption band at about 960 $cm^{-1}$ which band is not present either in the spectrum of pure silicalite-1, or in the IR spectrum of titanium oxides (rutile, anatase) and alkaline titanates. The ratio of the intensity of 960 $cm^{-1}$ band and that of 550 $cm^{-1}$ band is found to have linear correlation with their titanium content as can be seen from Table-3.

The adsorption capacities of the material of the present invention, determined gravimetrically using a conventional Cahn balance at 298 K and $p/p_o$=0.5, for water, n-hexane and cyclohexane, were found to be 6%, 12% and 6% by weight respectively. These adsorption results clearly demonstrate the absence of amorphous material occluded within the pores of the titanium silicates of the present invention.

In the method for the preparation of the titanium silicates, there is used a reaction mixture comprising the sources of $SiO_2$, $TiO_2$-acetylacetone complex, an organic base and water, and having the reagent molar composition as given above. The $SiO_2$ source is preferably a tetraalkyl orthosilicate (e.g. tetraethyl orthosilicate) or a colloidal silica. The source of titanium is preferably a hydrolysable titanium compound e.g. $TiCl_4$ or $TiOCl_2$ or Ti-alkoxides (e.g. $Ti(OC_4H_9)_4$. The complexing agent is β-diketone (such as acetylacetone or acetonylacetone). If titanium alkoxide is not used as titanium source, a mixture of alcohol (ROH) and β-diketone (like acetylacetone and/or acetonyl acetone, preferably equimolar) is/are used. The organic base is a tetraalkyl ammonium hydroxide e.g. tetrapropyl ammonium hydroxide. The starting reagent mixture is subjected to hydrothermal treatment in an autoclave at a temperature of between 150° C. to 200° C. under autogeneous pressure, under static or rotating conditions for a time of 1–5 days till the crystals of titanium silicates are formed. The crystalline solid material so obtained is separated from mother liquor, washed thoroughly with deionized water and dried. The crystalline as synthesized and dried material is preferably calcined in an airflow at 500°–550° C. for 6–24 hours until the organic material is decomposed. The final organic free, anhydrous, titanium silicates of the present invention have the composition:

$$x\,TiO_2:(1-x)\,SiO_2$$

where the value of x is equal or less than 0.075.

These crystalline material can be subjected to ion exchange treatment with an aqueous solution containing ammonium ions using conventional ion exchange procedures, filtration, washing with water, drying and calcining at 400°–500° C. for 16 hours. Though the catalyst composite material obtained herein before may be directly used as a catalyst, it is desirable in various industrial applications, to enhance the mechanical strength and ease of handling by admixing it with a suitable binder material and converting it into a suitable shape such as cylindrical extrudates, spheres, etc. Silica, clay mineral, such as bentonite, kaolinite or mixtures thereof are the examples of suitable binder material which impart improved mechanical properties to the titanium silicate.

The crystalline titanium silicate prepared according to the process of the invention are particularly useful in 1) oxidation/hydroxylation of hydrocarbons or derivatives of hydrocarbons, 2) ammoximation of ketones, aldehydes, and 3) oxidation of organic sulfides, amines etc.

The practice of the process of the present invention is further illustrated by the following examples which are, however, not to be construed to limit the scope of the present invention.

EXAMPLE 1

In this example the improved process for the preparation of crystalline microporous titanium silicates is described. 85 g. of tetraethyl orthosilicate were taken in a polypropylene beaker and a mixture comprising of 132 g tetrapropyl ammoniumhydroxide (20 wt. % solution in water), was added to it under stirring. This mixture was stirred for two hours before adding to it a solution of 6.8 g. titanium tetrabutoxide in 6 g acetylacetone under stirring. This mixture was stirred for another 2 hours at 50°–60° C. before adding it to 326 g. deionized water. The whole mixture was transferred into a stainless steel autoclave and the autoclave was capped tightly and put in an oven thermostated at 170°±1° C. The crystallization was carried out under static conditions for two days. Then the autoclave was removed from the oven and the crystallization was terminated by quenching the autoclave with cold water. The autoclave was opened after it is cooled, the contents were filtered, washed thoroughly with deionized water and dried at 120° C. for 8 hours and further calcined at 500°–550° C. in a flow of air for 6 to 24 hours. The XRD and IR data of the so obtained material corresponded to those given in Table-1 and Table-2, respectively. The material is identified as a titanium silicate with the crystal structure of silicalite-1. The molar chemical composition of the organic free calcined material was: 0.056 $TiO_2$:0.944 $SiO_2$. The material was fully crystalline and no amorphous matter either within or outside its pores was detected confirming that the synthesis had been completed in three days. This titanium silicate material was treated with 1N aqueous solution of ammonium acetate under reflux conditions for 4 hours, filtered, washed thoroughly with deionized water, dried at 120° C. for 8 hours and calcined at 500° C. in a flow of air for 16 hours before using it as a catalyst.

EXAMPLE 2

In this example, 63.7 g. of tetraethyl orthosilicate was taken in a polypropylene beaker and a mixture comprising of 122 g. tetra-propyl ammonium hydroxide (20 wt. % solution in water), was added to it under stirring. This mixture was stirred for two hours before adding to it a solution of 7.4 g. titanium tetrabutoxide in 5.4 g. ethylculoacetate under stirring. This mixture was stirred for another 2 hours at 50°–60° C. before adding it to g. deionized water. The material identified as a titanium silicate had chemical composition 0.075 $TiO_2$: 0.925 $SiO_2$. The remaining procedure was same as given in example-1.

EXAMPLE 3

In this example 106 g. of tetraethyl orthosilicate was mixed under stirring with a solution of 5.25 g. titaniumbutoxide in 4.5 g. acetonylacetone 132 g. tetrapropyl ammonium hydroxide (20 wt % solution in water) was added slowly to the above mixture under stirring. The remaining procedure was same as given in example-1. The x-ray and i.r. data exhibited by the sample obtained in this example were essentially the same as given in Table-1 and Table-2, respectively. The molar chemical composition of the material was 0.032 $TiO_2$:0.968 $SiO_2$.

EXAMPLE 4

In this example, silica gel was used as a source of silicon. 24 g. silica gel was mixed with 203 g. tetrapropyl ammonium hydroxide (20 wt % solution in water) under stirring. After about 1 hour, solution comprising 6 g. titanium tetrabutoxide and 5.2 g. acetylacetone was added to the above mixture at room temperature and the whole mixture was further stirred at the same temperature before adding to it 162 g. deionized water. The crystallization was done at 170° C. for 4 days. The material obtained exhibited essentially the same x-ray diffraction and i.r. data as given in Table-1, and Table-2, respectively. The chemical composition of the material was: 0.044 $TiO_2$:0.956 $SiO_2$. The remaining procedure was same as given in example 1.

EXAMPLE 5

This example illustrates the use of colloidal silica as the source of $SiO_2$ in the process for the preparation of the titanium silicates of this invention. 64.3 g. silica sol (28% $SiO_2$, 72% $H_2O$) was mixed with 75 g. tetrapropyl ammonium hydroxide (20 wt. % solution in water) under stirring. After about 1 hour, a solution comprising 1.74 g. titanium tetrabutoxide and 1.5 g. acetylacetone was added to the above mixture at room temperature and the whole mixture was further stirred at the same temperature before adding to it 16 g. deionized water. The crystallization was done at 170° C. for 4 days. The material obtained exhibited essentially the same x-ray diffraction and i.r. data as given in Table-1, and Table-2, respectively. The chemical composition of the material was: 0.17 $TiO_2$:0.983 $SiO_2$.

EXAMPLE 6

This example illustrates the catalytic activity of the product obtained in example-1. 3 g. of the material obtained according to example 1, (x=0.056) were added to a mixture containing 15 g. phenol and 90 g. acetone under stirring. The temperature of this mixture was kept low around 5° C. Then 7.2 g. of $H_2O_2$ (25%), precooled to 5° C. were added drop wise to the reaction mixture under stirring. After the completion of the addition of $H_2O_2$ the reaction mixture was heated up to 60° C. Then this reaction was carried out for 15 hours. The reaction mixture was filtered to separate the catalyst, and the solvent was distilled off under vacuum. The products contained catechol and hydroquinone in 1.5:1 mole ratio with 100% utilization of hydrogen peroxide. The catalytic activity of the material in this reaction confirms that silicon is substituted by titanium in the crystalline framework since silicalite-1 with occluded titanium does not possess any catalytic activity in this reaction.

EXAMPLE 7

In this example the influence of titanium content of titanium silicas in the hydroxylation of phenol into catechol and hydroquinone using hydrogen peroxide is illustrated. The results, recorded in Table 4, clearly demonstrate that the activity of titanium silicas increases with its titanium content.

TABLE 4

|  | x(Ti/(Ti + Si)) | | | | | |
|---|---|---|---|---|---|---|
|  | 0 | 0.017 | 0.032 | 0.044 | 0.056 | 0.075 |
| Phenol conversion (% theoretical) | 0 | 50 | 68 | 78 | 90 | 93 |
| Products (%) |  |  |  |  |  |  |
| hydroquinone | 0 | 45 | 47 | 47 | 46 | 47 |
| catechol | 0 | 55 | 53 | 53 | 54 | 53 |

We claim:

1. A process for the preparation of crystalline microporous titanium silicates having the chemical formula: x $TiO_2$:(1−x) $SiO_2$ wherein x is greater than 0.04 and less than or equal to 0.075 and characterized by an x-ray diffraction pattern as shown in Table 1 and an infrared absorption spectrum as shown in Table 2, consisting essentially of the steps of forming a gel by mixing a starting mixture containing (a) a source of silicon oxide, (b) a source of titanium oxide, (c) a source of β-diketone, (d) tetrapropyl ammonium hydroxide and (e) water, heating said gel at an autogenous pressure and a temperature between 100° to 200° C. for a time of 1–5 days to obtain a solid composite material, filtering, washing and drying said solid composite material to form a dried composite material, and calcining said dried solid composite material at a temperature above 300° C.

2. The process of claim 1 wherein x is at least 0.044.

3. The process of claim 1 wherein x is at least 0.056.

4. A process as claimed in claim 1 wherein said starting mixture further comprises an alcohol having a formula R—OH where R is an alkyl group having 2–5 carbon atoms.

5. A process as claimed in claim 1, wherein the source of titanium oxide is a titanium alkoxide.

6. A process as claimed in claim 1 wherein the source of said silicon oxide is colloidal silica, tetraalkyl orthosilicate, pyrogenic silica or silica gel.

7. A process as claimed in claim 1 wherein said starting mixture has a molar composition of 0.002–0.075 $TiO_2$:0.004–0.2 acetylacetone:1 $SiO_2$:0.2–1.0 $(CH_3H_7)_4N^+$:1.0–5.0 ROH:15–200 $H_2O$, wherein R is an alkyl group having less than or equal to 5 carbon atoms.

8. The process of claim 1 wherein said β-diketone is selected from the group consisting of acetylacetone, acetonylacetone, ethylacetoacetate and mixtures thereof.

9. A process for the preparation of crystalline microporous titanium silicate having the chemical formula: x $TiO_2$:(1−x) $SiO_2$ wherein x is greater than 0.04 and less than or equal to 0.075 comprising the steps of forming a gel by mixing a starting mixture containing (a) a source of silicon oxide, (b) a source of titanium oxide, (c) a source of β-diketone, (d) tetrapropyl ammonium hydroxide and (e) water, heating said gel at an autogenous pressure and a first temperature between 100° to 200° C. for a time of between 1 to 5 days yielding a solid composite material, filtering, washing and drying said solid composite material to form a dried composite material and calcining said dried solid composite material at a temperature greater than or equal to 300° C.

10. The process of claim 9 wherein said β-diketone is selected from the group consisting of acetylacetone, acetonylacetone, ethylacetoacetate and mixtures thereof.

11. A process for the preparation of crystalline microporous titanium silicates having the chemical formula: x $TiO_2$:(1−x) $SiO_2$ wherein x is greater than 0.04 and less than or equal to 0.075 consisting essentially of the steps of forming a gel by mixing a starting mixture containing (a) a source of silicon oxide, (b) a source of titanium oxide, (c) a source of β-diketone, (d) tetrapropyl ammonium hydroxide and (e) water, heating said gel at an autogenous pressure and a first temperature between 100° to 200° C. for a time of between 1 to 5 days yielding a solid composite material and filtering said composite material yielding a filtered material.

12. The process of claim 11 wherein x is at least 0.044.

13. The process of claim 11 wherein x is at least 0.056.

14. The process of claim 11 further comprising the step of washing said filtered material yielding a washed material.

15. The process of claim 14 further comprising the step of drying said washed material yielding a dried material.

16. The process of claim 15 wherein said dried material is calcined at a temperature of greater than or equal to 300° C.

17. The process of claim 11 wherein said β-diketone is selected from the group consisting of acetylacetone, acetonylacetone, ethylacetoacetate and mixtures thereof.

18. The process of claim 9 wherein x is at least 0.044.

19. The process of claim 9 wherein x is at least 0.056.

* * * * *